(12) United States Patent
Nakajima et al.

(10) Patent No.: US 6,781,715 B1
(45) Date of Patent: Aug. 24, 2004

(54) IMAGE PROCESSING METHOD AND SYSTEM

(75) Inventors: Masato Nakajima, Amimachi (JP); Hashimoto Koichi, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/520,807

(22) Filed: Mar. 8, 2000

(30) Foreign Application Priority Data

Mar. 9, 1999 (JP) ............................................ 11-061277

(51) Int. Cl.[7] .............................. G03F 3/08; G06K 9/00
(52) U.S. Cl. ...................... 358/1.9; 358/518; 382/162
(58) Field of Search ................................ 358/498, 518, 358/520, 522, 521, 1.9, 505, 501, 401, 515, 530; 382/162, 167, 168, 166

(56) References Cited

U.S. PATENT DOCUMENTS

| | | | |
|---|---|---|---|
| 5,426,517 A | * 6/1995 | Schwartz | ..................... 358/520 |
| 5,450,217 A | 9/1995 | Eschbach et al. | |
| 5,712,925 A | 1/1998 | Ohga | |
| 5,828,780 A | * 10/1998 | Suzuki et al. | ................ 382/167 |
| 6,463,173 B1 | * 10/2002 | Tretter | ......................... 382/168 |

FOREIGN PATENT DOCUMENTS

| | | |
|---|---|---|
| EP | 0 486 311 A2 | 5/1992 |
| EP | 0 652 674 A2 | 5/1995 |
| EP | 0 723 364 A2 | 7/1996 |
| JP | 4-287569 | 10/1992 |

OTHER PUBLICATIONS

Patent Abstracts of Japan vol. 1998, No. 05, Apr. 30, 1998 & JP 10 023279 A (Fuji Xerox Co. Ltd.), Jan. 23, 1998 *Abstract*.
European Search Report Dated Nov. 18, 2003.

* cited by examiner

*Primary Examiner*—Kimberly Williams
*Assistant Examiner*—Thomas Lett, II
(74) *Attorney, Agent, or Firm*—Nixon Peabody LLP; Donald R. Studebaker

(57) ABSTRACT

A transformation curve for compressing the color image signal within the color reproduction range of the color image output system is generated according to the number of picture elements whose colors are inside the color reproduction range of the color image output system out of the picture elements included in the predetermined region. The color of each picture element is transformed on the basis of the transformation curve thus generated, and a color image signal made up of signal components representing the colors of the picture elements thus transformed is output to the color image output system as the processed image signal.

6 Claims, 6 Drawing Sheets

$|P-A|=a$
$|P-B|=b$ $|P - P_{i,j}| = d$
$|P - P'| = d'$

PRIOR ART

PRIOR ART

IMAGE PROCESSING METHOD AND SYSTEM

BACKGROUND OF THE INVENTION

1. Field of the Invention

This invention relates to a method of and a system for carrying out image processing on image data obtained by a color image read-out means such as an image scanner.

2. Description of the Related Art

When a dark picture or a light picture is output from a color image output means such as a printer which is narrow in color reproduction range, jump in brightness occurs in a light part and a chromaticity differentiation loss occurs in a dark part. Conventionally, such jump in brightness and/or chromaticity differentiation loss are prevented by enhancing gradation of an image represented by image data obtained by a color image read-out means such as an image scanner by carrying out contrast enhancement processing on the image data. In the contrast-enhanced image data, color information of the image data is compressed within the color reproduction range of the color image output means so that the color information on the image is held after output of a picture.

As methods of enhancing contrast, there have been known a graylevels mapping method, a histogram equalization method and the like. (See "Handbook of Image Analysis", Tokyo University Publisher) Further, the color compression has been carried out by employing such processing as illustrated in FIG. 8 or 9. In the processing shown in FIG. 8, a color P1 inside the color reproduction range of the image output means is output as it is, and a color P2 outside the color reproduction range is output as a color P2' which is the closest to the color P2 among colors inside the color reproduction range. In the processing shown in FIG. 8, colors of the original which are inside the color reproduction range of the image output means are faithfully reproduced on the output picture. Accordingly, the processing shown in FIG. 8 is generally referred to as "faithful color reproduction compression processing". To the contrast, in the processing shown in FIG. 9, a color transformation curve is obtained on the basis of the ratio between the color read-out range of the image read-out means and the color reproduction range of the image output means, and colors are transformed according to the color transformation curve irrespective of whether the color is inside or outside the color reproduction range, e.g., a color P1 inside the color reproduction range is transformed to a color P1' and a color P2 outside the color reproduction range is transformed to a color P2' inside the color reproduction range. In accordance with the processing shown in FIG. 9, colors outside the color reproduction range cannot be saturated and a chromaticity differentiation loss cannot occur. Accordingly, the processing shown in FIG. 9 is generally referred to as "desaturated color reproduction compression processing".

However, when the faithful color reproduction compression processing is carried out on image data having a lot of colors outside the color reproduction range of the image output means, an excessive number of colors are concentrated near the outer periphery of the color reproduction range, whereby a chromaticity differentiation loss occurs with colors in the whole picture. Accordingly, when the image represented by the input image data (which will be referred to as "the input image", hereinbelow) is a light image, jump in brightness occurs in a light part of the output picture, and when the input image is a dark image, a chromaticity differentiation loss occurs in a dark part of the output picture. Further when the input image is bright, color saturation occurs in a bright part of the output picture and the appearance of the output picture becomes very unnatural. On the other hand, when desaturated color reproduction compression processing is carried out on image data having a lot of colors inside the color reproduction range of the image output means, chroma of the output picture greatly deteriorates since the color range of the input image is compressed though the image output means is able to faithfully reproduce almost all the colors of the input image.

In order to overcome such a problem, there has been proposed a method in which picture elements of the input image having colors inside the color reproduction range of the image output means are counted and the faithful color reproduction compression processing or the desaturated color reproduction compression processing is selected on the basis of the number of the picture elements having colors inside the color reproduction range. See, for instance, Japanese Unexamined Patent Publication No. 4(1992)-287569.

In the graylevels mapping method and the histogram equalization method, contrast enhancement processing is uniformly carried out over the entire image, and accordingly, when such a method is applied to an image having a part where gradation locally changes, gradation of the part is flattened. Accordingly, when the graylevels mapping method or the histogram equalization method is applied to image data representing an image such as a picture taken against the light where light parts and dark parts are mingled with each other, jump in brightness and/or chromaticity differentiation loss in the output picture can be enhanced.

When the method disclosed in Japanese Unexamined Patent Publication No. 4(1992)-287569 is applied to an image where though picture elements having colors inside the color reproduction range of the image output means are larger in number than those having colors outside the range, the picture elements having colors outside the range are localized in a small region, the faithful color reproduction compression processing is selected. However, if the faithful color reproduction compression processing is carried out on such an image, a chromaticity differentiation loss occurs in the small region. On the other hand, when the method disclosed in Japanese Unexamined Patent Publication No. 4(1992)-287569 is applied to an image where though picture elements having colors outside the color reproduction range of the image output means are larger in number than those having colors inside the range, the picture elements having colors inside the range are localized in a small region, the desaturated color reproduction compression processing is selected. However if the desaturated color reproduction compression processing is carried out on such an image, gradation of the small region deteriorates.

SUMMARY OF THE INVENTION

In view of the foregoing observations and description, the primary object of the present invention is to provide a method of and a system for image processing which can process image data representing an image like a picture taken against the light where a dark part or a light part is localized in a small part in the image so that a picture which is visually excellent and free from local jump in brightness or local chromaticity differentiation loss can be output from an image output means having a limited color reproduction range.

In accordance with a first aspect of the present invention, there is provided an image processing method for carrying out image processing on a color image signal which is made up of a plurality of signal components representing respective picture elements and is obtained by a color image read-out means having a limited color read-out range and outputting a processed color image signal to a color image output means having a limited color reproduction range, the method comprising the steps of counting, for each of the picture elements represented by the color image signal, picture elements whose colors are inside the color reproduction range of the color image output means out of the picture elements included in a predetermined region including the picture element, generating, according to the number of picture elements whose colors are inside the color reproduction range of the color image output means out of the picture elements included in said predetermined region, a transformation curve for compressing the color image signal within the color reproduction range of the color image output means, transforming the color of each picture element on the basis of the transformation curve thus generated, and outputting a color image signal made up of signal components representing the colors of the picture elements thus transformed to said color image output means as said processed image signal.

It is preferred that the transformation curve be a first transformation curve on the basis of which a color inside the color reproduction range is not transformed and a color outside the color reproduction range is transformed to a color which is the closest to the color among colors inside the color reproduction range when the number of picture elements whose colors are inside the color reproduction range of the color image output means out of the picture elements included in said predetermined region is equal to the total number of the picture elements included in said predetermined region, a second transformation curve on the basis of which all the colors represented by the color image signal are transformed to colors inside the color reproduction range of the image output means according to the ratio between the color read-out range of the image read-out means and the color reproduction range of the image output means irrespective of whether the color is inside or outside the color reproduction range when the number of picture elements whose colors are inside the color reproduction range of the color image output means out of the picture elements included in said predetermined region is 0, and a third transformation curve which is obtained by interpolation between the first and second transformation curves according to the number of picture elements whose colors are inside the color reproduction range of the color image output means out of the picture elements included in said predetermined region when the number of picture elements whose colors are inside the color reproduction range of the color image output means out of the picture elements included in said predetermined region is larger than 0 and smaller than the total number of the picture elements included in said predetermined region.

For example, the first transformation curve may be a transformation curve employed in the aforesaid faithful color reproduction compression processing and the second transformation curve may be a transformation curve employed in the aforesaid desaturated color reproduction compression processing.

In accordance with a second aspect of the present invention, there is provided an image processing method for carrying out image processing on a color image signal which is made up of a plurality of signal components representing respective picture elements and is obtained by a color image read-out means having a limited color read-out range and outputting a processed color image signal to a color image output means having a limited color reproduction range, the method comprising the steps of carrying out local contrast enhancement processing on each of the picture elements represented by the color image signal on the basis of the signal components representing the picture elements included in a first predetermined region including the picture element, thereby obtaining a local-contrast-enhanced color image signal made up of signal components representing the respective picture elements subjected to the local contrast enhancement processing, counting, for each of the picture elements represented by the local-contrast-enhanced color image signal, picture elements whose colors are inside the color reproduction range of the color image output means out of the picture elements included in a second predetermined region including the picture element, generating, according to the number of picture elements whose colors are inside the color reproduction range of the color image output means out of the picture elements included in said second predetermined region, a transformation curve for compressing the local-contrast-enhanced color image signal within the color reproduction range of the color image output means, transforming the color of each picture element on the basis of the transformation curve thus generated, and outputting a color image signal made up of signal components representing the colors of the picture elements thus transformed to said color image output means as said processed image signal.

In the image processing method in accordance with the first or second aspect of the present invention, the "predetermined region", the "first predetermined region" and the "second predetermined region" may be, for instance, a square region including therein several picture elements. Further, the expression "generating, according to the number of picture elements whose colors are inside the color reproduction range of the color image output means out of the picture elements included in said (second) predetermined region, a transformation curve" means to generate, as the number of picture elements whose colors are inside the color reproduction range of the color image output means out of the picture elements included in said (second) predetermined region increases, a transformation curve which is closer to the aforesaid faithful color reproduction compression processing and to generate, as the number of picture elements whose colors are inside the color reproduction range of the color image output means out of the picture elements included in said (second) predetermined region decreases, a transformation curve which is closer to the aforesaid desaturated color reproduction compression processing, or to generate, when the number of picture elements whose colors are inside the color reproduction range of the color image output means out of the picture elements included in said (second) predetermined region is larger than a predetermined value, a transformation curve which is substantially equal to the aforesaid faithful color reproduction compression processing and to generate, when the number of picture elements whose colors are inside the color reproduction range of the color image output means out of the picture elements included in said (second) predetermined region is not larger than the predetermined value, a transformation curve which is substantially equal to the aforesaid desaturated color reproduction compression processing. In this case, a transformation curve obtained by combining, according to the number of picture elements whose colors are inside the color reproduction range of the color image output means out of the picture elements included in said (second) predetermined region, a transformation curve for carrying out the faithful color reproduction compression processing and a transformation curve for carrying out the desaturated color reproduction compression processing is generated.

In the image processing method in accordance with the second aspect of the present invention, it is preferred that the local contrast enhancement processing be processing in which local contrast around each picture element is enhanced by local histogram equalization method based on lightness components of the signal components representing the picture elements included in the first predetermined region.

Further, in the image processing method in accordance with the second aspect of the present invention, it is preferred that the transformation curve be a first transformation curve on the basis of which a color inside the color reproduction range is not transformed and a color outside the color reproduction range is transformed to a color which is the closest to the color among colors inside the color reproduction range when the number of picture elements whose colors are inside the color reproduction range of the color image output means out of the picture elements included in said second predetermined region is equal to the total number of the picture elements included in said second predetermined region, a second transformation curve on the basis of which all the colors represented by the color image signal are transformed to colors inside the color reproduction range of the image output means according to the ratio between the color read-out range of the image read-out means and the color reproduction range of the image output means irrespective of whether the color is inside or outside the color reproduction range when the number of picture elements whose colors are inside the color reproduction range of the color image output means out of the picture elements included in said second predetermined region is 0, and a third transformation curve which is obtained by interpolation between the first and second transformation curves according to the number of picture elements whose colors are inside the color reproduction range of the color image output means out of the picture elements included in said second predetermined region when the number of picture elements whose colors are inside the color reproduction range of the color image output means out of the picture elements included in said second predetermined region is larger than 0 and smaller than the total number of the picture elements included in said second predetermined region.

In accordance with a third aspect of the present invention, there is provided an image processing system for carrying out image processing on a color image signal which is made up of a plurality of signal components representing respective picture elements and is obtained by a color image read-out means having a limited color read-out range and outputting a processed color image signal to a color image output means having a limited color reproduction range, the system comprising a counter which counts, for each of the picture elements represented by the color image signal, picture elements whose colors are inside the color reproduction range of the color image output means out of the picture elements included in a predetermined region including the picture element, a transformation curve generator which generates, according to the number of picture elements whose colors are inside the color reproduction range of the color image output means out of the picture elements included in said predetermined region, a transformation curve for compressing the color image signal within the color reproduction range of the color image output means, a transformer which transforms the color of each picture element on the basis of the transformation curve generated by the transformation curve generator, and an output means which outputs a color image signal made up of signal components representing the colors of the picture elements thus transformed to said color image output means as said processed image signal.

In the image processing system in accordance with the third aspect of the present invention, it is preferred that the transformation curve generator generates a first transformation curve on the basis of which a color inside the color reproduction range is not transformed and a color outside the color reproduction range is transformed to a color which is the closest to the color among colors inside the color reproduction range when the number of picture elements whose colors are inside the color reproduction range of the color image output means out of the picture elements included in said predetermined region is equal to the total number of the picture elements included in said predetermined region, a second transformation curve on the basis of which all the colors represented by the color image signal are transformed to colors inside the color reproduction range of the image output means according to the ratio between the color read-out range of the image read-out means and the color reproduction range of the image output means irrespective of whether the color is inside or outside the color reproduction range when the number of picture elements whose colors are inside the color reproduction range of the color image output means out of the picture elements included in said predetermined region is 0, and a third transformation curve which is obtained by interpolation between the first and second transformation curves according to the number of picture elements whose colors are inside the color reproduction range of the color image output means out of the picture elements included in said predetermined region when the number of picture elements whose colors are inside the color reproduction range of the color image output means out of the picture elements included in said predetermined region is larger than 0 and smaller than the total number of the picture elements included in said predetermined region.

In accordance with a fourth aspect of the present invention, there is provided an image processing system for carrying out image processing on a color image signal which is made up of a plurality of signal components representing respective picture elements and is obtained by a color image read-out means having a limited color read-out range and outputting a processed color image signal to a color image output means having a limited color reproduction range, the system comprising a local contrast enhancement means which carries out local contrast enhancement processing on each of the picture elements represented by the color image signal on the basis of the signal components representing the picture elements included in a first predetermined region including the picture element, thereby obtaining a local-contrast-enhanced color image signal made up of signal components representing the respective picture elements subjected to the local contrast enhancement processing, a counter which counts, for each of the picture elements represented by the local-contrast-enhanced color image signal, picture elements whose colors are inside the color reproduction range of the color image output means out of the picture elements included in a second predetermined region including the picture element, a transformation curve generator which generates, according to the number of picture elements whose colors are inside the color reproduction range of the color image output means out of the picture elements included in said second predetermined region, a transformation curve for compressing the local-contrast-enhanced color image signal within the color reproduction range of the color image output means, a transformer which transforms the color of each picture element on the basis of the transformation curve generated by the transformation curve generator, and an output means which outputs a color image signal made up of signal components representing the colors of the picture elements thus transformed to said color image output means as said processed image signal.

In the image processing system in accordance with the fourth aspect of the present invention, it is preferred that the local contrast enhancement means carries out processing in which local contrast around each picture element is enhanced by local histogram equalization method based on lightness components of the signal components representing the picture elements included in the first predetermined region.

Further, in the image processing system in accordance with the fourth aspect of the present invention, it is preferred that the transformation curve generator generates a first transformation curve on the basis of which a color inside the color reproduction range is not transformed and a color outside the color reproduction range is transformed to a color which is the closest to the color among colors inside the color reproduction range when the number of picture elements whose colors are inside the color reproduction range of the color image output means out of the picture elements included in said second predetermined region is equal to the total number of the picture elements included in said second predetermined region, a second transformation curve on the basis of which all the colors represented by the color image signal are transformed to colors inside the color reproduction range of the image output means according to the ratio between the color read-out range of the image read-out means and the color reproduction range of the image output means irrespective of whether the color is inside or outside the color reproduction range when the number of picture elements whose colors are inside the color reproduction range of the color image output means out of the picture elements included in said second predetermined region is 0, and a third transformation curve which is obtained by interpolation between the first and second transformation curves according to the number of picture elements whose colors are inside the color reproduction range of the color image output means out of the picture elements included in said second predetermined region when the number of picture elements whose colors are inside the color reproduction range of the color image output means out of the picture elements included in said second predetermined region is larger than 0 and smaller than the total number of the picture elements included in said second predetermined region.

In the image processing method in accordance with the first aspect of the present invention and the image processing system in accordance with the third aspect of the present invention, a transformation curve for compressing the color image signal within the color reproduction range of the color image output means is generated according to the number of picture elements whose colors are inside the color reproduction range of the color image output means out of the picture elements included in a predetermined region including each picture element. The transformation curve is obtained, for instance, by combining a transformation curve for carrying out the faithful color reproduction compression processing and a transformation curve for carrying out the desaturated color reproduction compression processing according to the number of picture elements whose colors are inside the color reproduction range of the color image output means out of the picture elements included in said predetermined region. Accordingly, by transforming the color of each picture element on the basis of the transformation curve generated for the picture element, the color of each picture element is transformed to an optimal color according to the color of the picture elements around the picture element, whereby the color image signal can be compressed without a chromaticity differentiation loss or deterioration in gradation even if colors inside and outside the color reproduction range are locally concentrated in a small region.

In the image processing method in accordance with the second aspect of the present invention and the image processing system in accordance with the fourth aspect of the present invention, local contrast enhancement processing is carried out on each of the picture elements represented by the color image signal on the basis of the signal components representing the picture elements included in a first predetermined region including the picture element and a local-contrast-enhanced color image signal made up of signal components representing the respective picture elements subjected to the local contrast enhancement processing is obtained. Accordingly, as compared with the aforesaid conventional graylevels mapping method or the histogram equalization method, local contrast of an image can be successfully enhanced without jump in brightness and/or chromaticity differentiation loss even if the image is such as a picture taken against the light where light parts and dark parts are mingled with each other. After local contrast of the image is thus enhanced and a local-contrast-enhanced color image signal is obtained, a transformation curve for compressing the local-contrast-enhanced color image signal within the color reproduction range of the color image output means is generated according to the number of picture elements whose colors are inside the color reproduction range of the color image output means out of the picture elements included in a second predetermined region including each picture element. The transformation curve is obtained, for instance, by combining a transformation curve for carrying out the faithful color reproduction compression processing and a transformation curve for carrying out the desaturated color reproduction compression processing according to the number of picture elements whose colors are inside the color reproduction range of the color image output means out of the picture elements included in said second predetermined region. Accordingly, by transforming the color of each picture element on the basis of the transformation curve generated for the picture element, the color of each picture element is transformed to an optimal color according to the color of the picture elements around the picture element, whereby the color image signal can be compressed without a chromaticity differentiation loss or deterioration in gradation even if colors inside and outside the color reproduction range are locally concentrated in a small region.

DESCRIPTION OF THE PREFERRED EMBODIMENT

Figure 1:
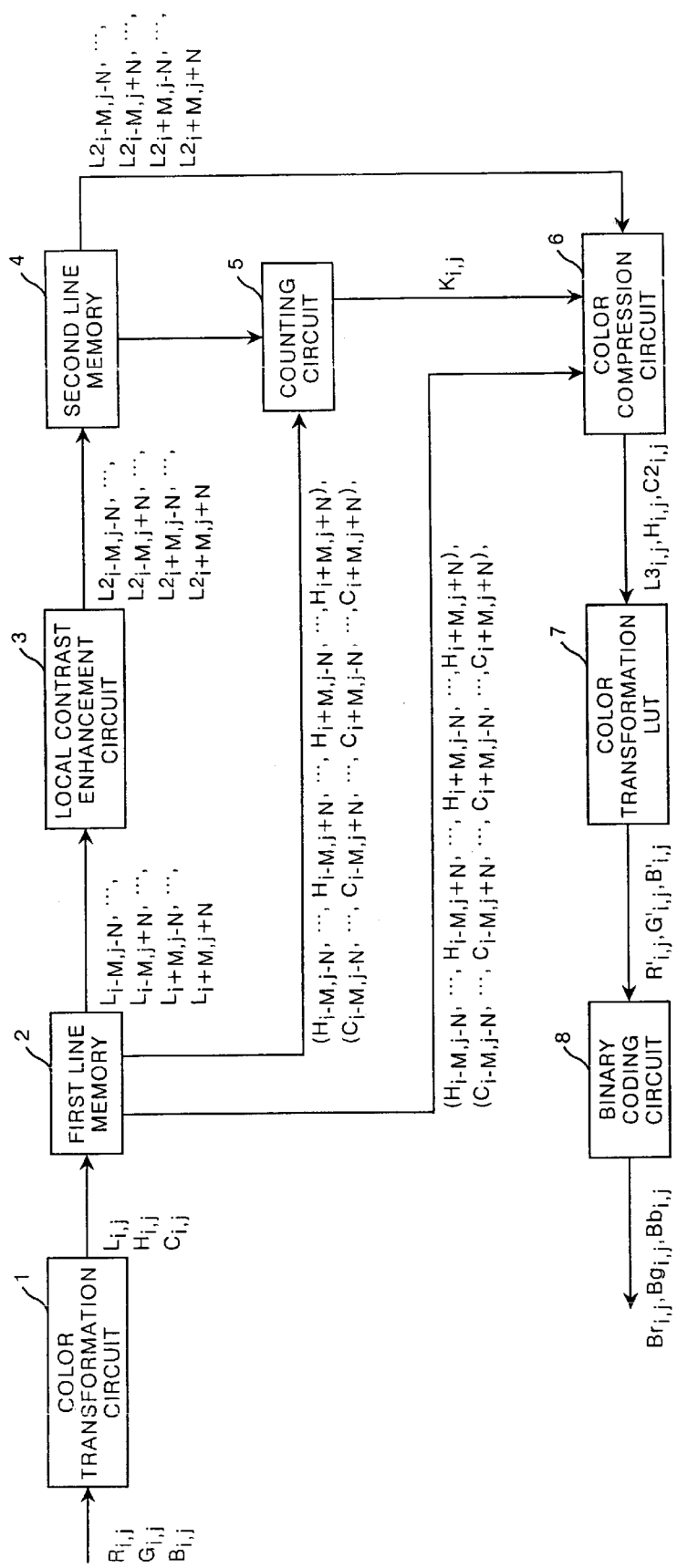
FIG. 1 is a block diagram showing an image processing system in accordance with an embodiment of the present invention.

As shown in FIG. 1, an image processing system in accordance with an embodiment of the present invention comprises a color transformation circuit 1. A color image signal obtained by a color image read-out system (not shown) is input into the color transformation circuit 1. The color image signal consists of three primary color signals respectively made up of Red-signal components $R_{i,j}$, Green-signal components $G_{i,j}$ and Blue-signal components $B_{i,j}$ wherein i stands for an integer larger than 0 and represents the number of the picture element as numbered in the sub-scanning direction and j stands for an integer larger than 0 and represents the number of the picture element as numbered in the main scanning direction. The color transformation circuit 1 transforms the three primary color information signals made up of Red-signal components $R_{i,j}$, Green-signal components $G_{i,j}$ and Blue-signal components $B_{i,j}$ into a lightness signal L made up of signal components $L_{i,j}$, a hue signal H made up of signal components $H_{i,j}$, and a chroma signal C made up of signal components $C_{i,j}$. The image processing system of this embodiment further comprises a first line memory 2 which temporarily stores the lightness signal L, the hue signal H and the chroma signal C, a local contrast enhancement circuit 3 which enhances local contrast of the image, a second line memory 4 which temporarily stores the lightness signal L whose local contrast has been enhanced, a counting circuit 5 which counts picture elements as will be described in detail later, a color compression circuit 6 which carries out color compression, a color transformation LUT (lookup table) 7 for transforming the compressed lightness signal, hue signal and chroma signal into Red-, Green- and Blue-signals, and a binary coding circuit 8 which binary-codes the signals transformed by the LUT 7.

Operation of the image processing system of this embodiment will be described, hereinbelow. In the color image read-out system (not shown), light passing through a red filter, light passing through a green filter and light passing through a blue filter are projected onto an original in sequence, and the red light, the green light and the blue light reflected at the original are converted to electric signals by a line sensor such as a CCD, whereby the three primary color signals respectively made up of Red-signal components $R_{i,j}$, Green-signal components $G_{i,j}$ and Blue-signal components $B_{i,j}$ are output. The color transformation circuit 1 transforms the three primary color information signals made up of Red-signal components $R_{i,j}$, Green-signal components $G_{i,j}$ and Blue-signal components $B_{i,j}$ into a lightness signal L made up of signal components $L_{i,j}$, a hue signal H made up of signal components $H_{i,j}$, and a chroma signal C made up of signal components $C_{i,j}$.

The first line memory 2 stores lightness signal components $L_{i,j}$, hue signal components $H_{i,j}$ and chroma signal components $C_{i,j}$ for W1 lines (W1>0). The stored lightness signal components $L_{i,j}$ are output to the local contrast enhancement circuit 3, and the stored hue signal components $H_{i,j}$ and chroma signal components $C_{i,j}$ are output to both the counting circuit 5 and the color compression circuit 6. The lightness signal components $L_{i,j}$ output from the first line memory 2 represents lightness of (2M+1)×(2N+1) picture elements in a rectangular region (will be referred to as "the reference region", hereinbelow) with a picture element $P_{i,j}$ (will be referred to as "the object picture element $P_{i,j}$", hereinbelow) positioned at the center of the reference region. The hue signal components $H_{i,j}$ output from the first line memory 2 represents hue of the (2M+1)×(2N+1) picture elements in the reference region. The chroma signal components $C_{i,j}$ output from the first line memory 2 represents chroma of the (2M+1)×(2N+1) picture elements in the reference region.

Figure 2A:
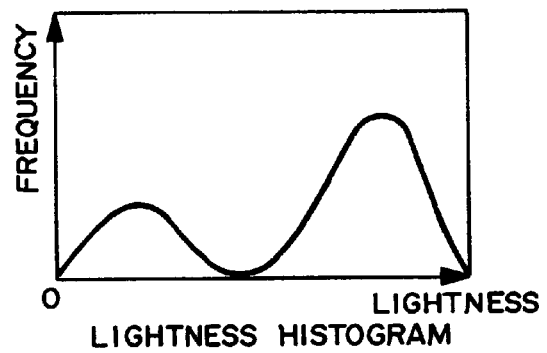
FIGS. 2A to 2C are views for illustrating local histogram equalization method.
Figure 2B:
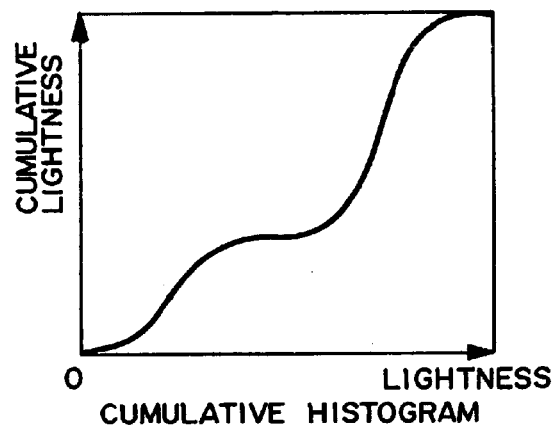
Figure 2C:
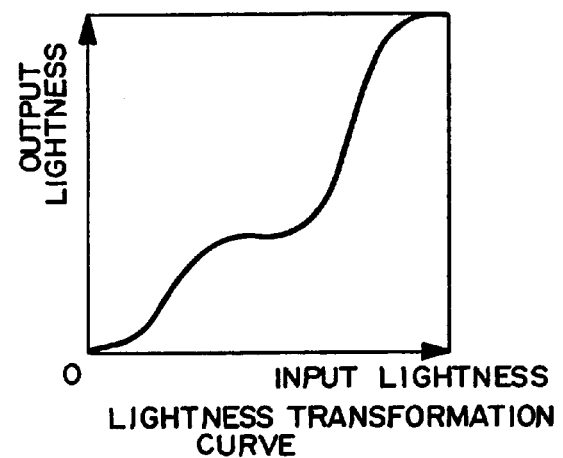

The lightness signal components $L_{i-M,j-N}, \ldots, L_{i-M,j+N}, \ldots, L_{i+M,j-N}, \ldots, L_{i+M,j+N}$ of all the picture elements in the reference region are input into the local contrast enhancement circuit 3. In the local contrast enhancement circuit 3, a histogram of all the lightness signal components $L_{i,j}$ input thereinto is produced as shown in FIG. 2A. Then a cumulative lightness histogram is calculated as shown in FIG. 2B on the basis of the lightness histogram. Reading of the ordinate of the cumulative lightness histogram is substituted by the output lightness and a lightness transformation curve is made as shown in FIG. 2C. The lightness of the object picture element $P_{i,j}$ is transformed on the basis of the lightness transformation curve and an enhanced lightness signal components $L2_{i,j}$ is output.

The second line memory 4 stores enhanced lightness signal components $L2_{i,j}$ for W2 lines (W2>0). The enhanced lightness signal components $L2_{i,j}$ stored in the second line memory 4 are output to the counting circuit 5. The enhanced lightness signal components $L2_{i,j}$ output from the second line memory 4 represents lightness of (2M+1)×(2N+1) picture elements in the reference region with an object picture element $P_{i,j}$ positioned at the center of the reference region.

The hue signal components $H_{i-M,j-N}, \ldots, H_{i-M,j+N}, \ldots, H_{i+M,j-N}, \ldots, H_{i+M,j+N}$ of all the picture elements in the reference region and the chroma signal components $C_{i-M,j-N}, \ldots, C_{i-M,j+N}, \ldots, C_{i+M,j-N}, \ldots, C_{i+M,j+N}$ of all the picture elements in the reference region which are output from the first line memory 2 are input into the counting circuit 5 as well as the enhanced lightness signal components $L2_{i-M,j-N}, \ldots, L2_{i-M,j+N}, \ldots, L2_{i+M,j-N}, \ldots, L2_{i+M,j+N}$ of all the picture elements in the reference region which are output from the second line memory 4. Color signal components are once generated on the basis of the signal components input into the counting circuit 5 and the number $K_{i,j}$ of the picture elements whose colors are inside the color reproduction range of the color image output system out of the picture elements included in the reference region is output to the color compression circuit 6 as a picture element number signal.

The hue signal components $H_{i-M,j-N}, \ldots, H_{i-M,j+N}, \ldots, H_{i+M,j-N}, \ldots, H_{i+m,j+N}$ of all the picture elements in the reference region and the chroma signal components $C_{i-M,j-N}, \ldots, C_{i-M,j+N}, \ldots, C_{i+M,j-N}, \ldots, C_{i+M,j+N}$ of all the picture elements in the reference region which are output from the first line memory 2 are input into the color compression circuit 6 as well as the enhanced lightness signal components $L2_{i-M,j-N}, \ldots, L2_{i-M,j+N}, \ldots, L2_{i+M,j-N}, \ldots, L2_{i+M,j+N}$ of all the picture elements in the reference region which are output from the second line memory 4 and the picture element number signal $K_{i,j}$.

Figure 3:
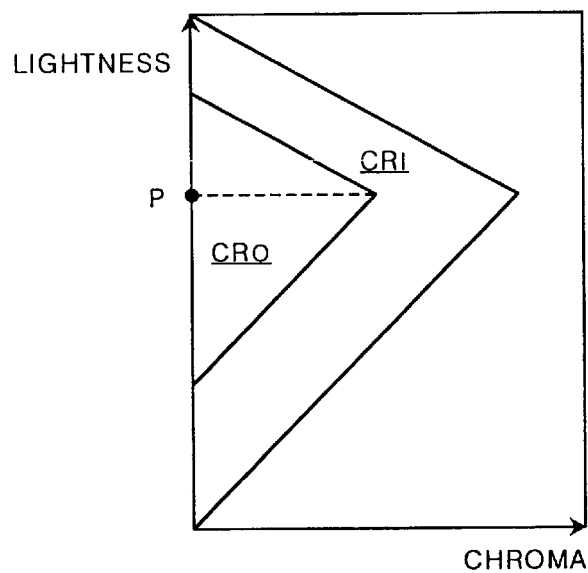
FIG. 3 is a view for illustrating a way of determining the compression center.
Figure 4:
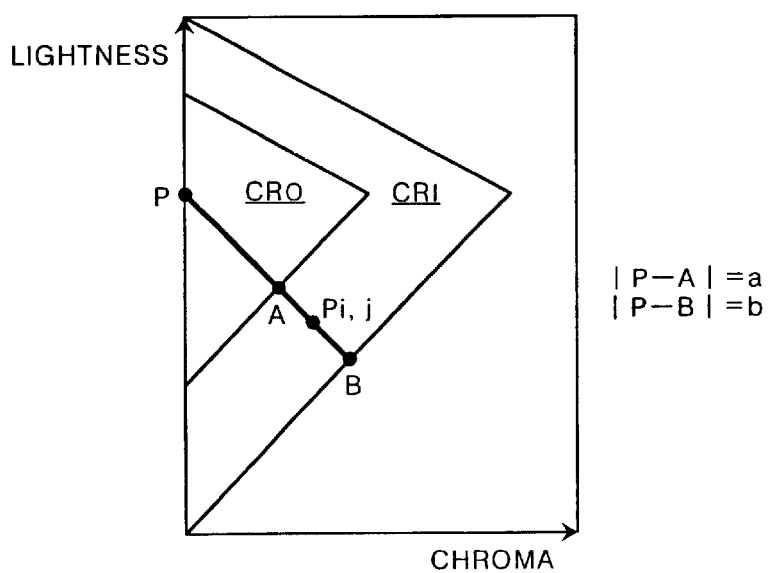
FIG. 4 is a view showing variables for color compression.
Figure 5:
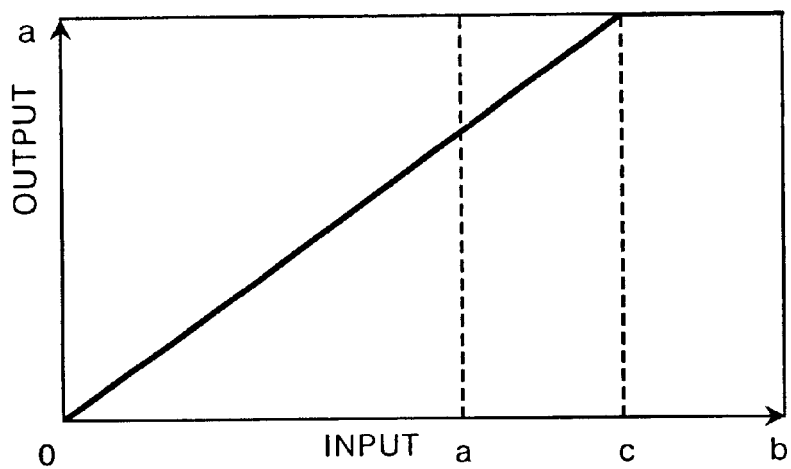
FIG. 5 is a view showing an example of the color compression transformation curve.

In the color compression circuit 6, a point of achromatic color whose lightness is equal to that of the point whose chroma is the highest in the color reproduction range $CR_O$ of the image output system is set as a color compression center P on a lightness-chroma cross-section as shown in FIG. 3. Then as shown in FIG. 4, an intersection A of a straight line passing through the color compression center P and the object picture element $P_{i,j}$ and the boundary of the color reproduction range $CR_O$ of the image output system and an intersection B of the straight line passing through the color compression center P and the object picture element $P_{i,j}$ and the boundary of the color read-out range $CR_I$ of the image read-out means are determined. Thereafter, two variables a and b, which are the distance between the color compression center P and the intersection A and the distance between the color compression center P and the intersection B, respectively, are determined. Then a color compression transformation curve as shown in FIG. 5 is generated according to the following formula (1) on the basis of the variables a and b and the picture element number signal $K_{i,j}$.

$$c=a+\{(2M+1)\times(2N+1)-K_{i,j}\}/\{(2M+1)\times(2N+1)\times(b-a)\} \quad (1)$$

Figure 6:
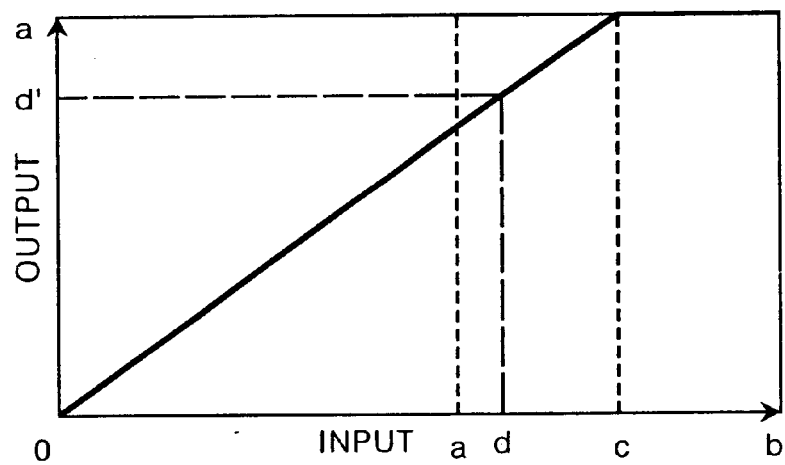
FIG. 6 is a view showing the manner of transforming colors by use of the color compression transformation curve.
Figure 7:
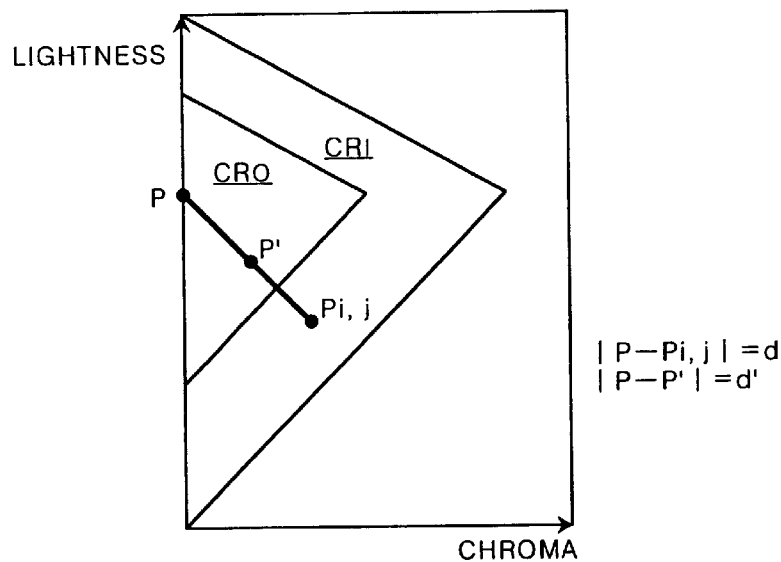
FIG. 7 is a view showing color transformation in a chroma-lightness cross-section.
Figure 8:
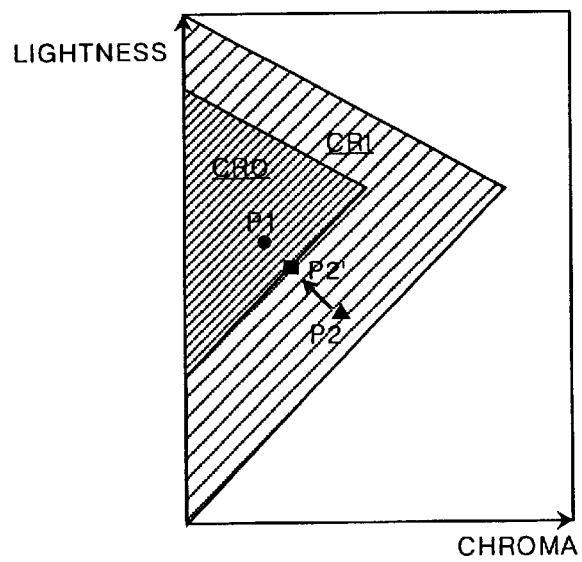
FIG. 8 is a view showing an example of conventional color compression methods.
Figure 9:
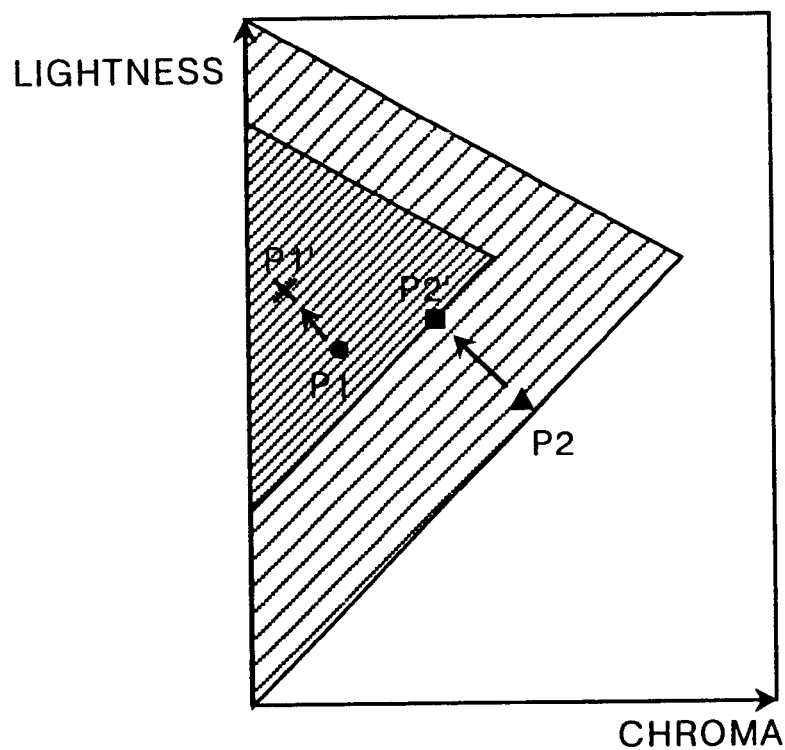
FIG. 9 is a view showing another example of conventional color compression methods.

The chroma signal component $C_{i,j}$ and the enhanced lightness signal component $L_{i,j}$ of the object picture element $P_{i,j}$ are transformed on the basis of the color compression transformation curve thus generated, and color-compressed lightness signal component $L3_{i,j}$, hue signal component $H_{i,j}$ and chroma signal component $C2_{i,j}$ of the object picture element $P_{i,j}$ are output. Specifically, when the distance between the color compression center P and the object picture element $P_{i,j}$ is assumed to be d, the distance d is transformed to d' as shown in FIG. 6, and the object picture element $P_{i,j}$ is transformed to P' which is at a distance d' from the compression center P as shown in FIG. 7.

When color compression is carried out by use of the color compression transformation curve obtained in this manner, the picture element number signal $K_{i,j}$ approaches $(2M+1)\times(2N+1)$ and c approaches a as the number of picture elements, out of those included in the reference region of $(2M+1)\times(2N+1)$, whose colors are inside the color reproduction range of the color image output means, increases, and the color compression carried out by use of the color compression transformation curve becomes closer to the faithful color reproduction compression processing. To the contrast, the picture element number signal $K_{i,j}$ approaches 0 and c approaches b as the number of picture elements, out of those included in the reference region of $(2M+1)\times(2N+1)$, whose colors are outside the color reproduction range of the color image output means, increases, and the color compression carried out by use of the color compression transformation curve becomes closer to the desaturated color reproduction compression processing.

The color-compressed lightness signal component $L3_{i,j}$, hue signal component $H_{i,j}$ and chroma signal component $C2_{i,j}$ of the object picture element $P_{i,j}$ output from the color compression circuit 6 are input into the color transformation LUT 7 and the LUT 7 transforms the color-compressed lightness signal component $L3_{i,j}$, hue signal component $H_{i,j}$ and chroma signal component $C2_{i,j}$ of the object picture element $P_{i,j}$ to output Red-signal component $R'_{i,j}$, Green-signal component $G'_{i,j}$ and Blue-signal component $B'_{i,j}$ on the basis of a lookup table, which has been prepared in advance and relates the values of the color-compressed lightness signal component $L3_{i,j}$, hue signal component $H_{i,j}$ and chroma signal component $C2_{i,j}$ with the values of output Red-signal component $R'_{i,j}$, Green-signal component $G'_{i,j}$ and Blue-signal component $B'_{i,j}$ which are to be input into the binary coding circuit 8 in order to output from the image output system a picture element represented by the color-compressed lightness signal component $L3_{i,j}$, hue signal component $H_{i,j}$ and chroma signal component $C2_{i,j}$.

The output Red-signal component $R'_{i,j}$, Green-signal component $G'_{i,j}$ and Blue-signal component $B'_{i,j}$ output from the color transformation LUT 7 are input into the binary coding circuit 8. The binary coding circuit 8 binary-codes the output Red-signal component $R'_{i,j}$, Green-signal component $G'_{i,j}$ and Blue-signal component $B'_{i,j}$ by pseudo-gradation-processing and outputs two-valued color image signal components $Br_{i,j}$, $Bg_{i,j}$ and $Bb_{i,j}$. The binary coding circuit 8 may comprise, for instance, a pseudo-gradation-processing circuit which carries out pseudo-gradation-processing based on a halftone dot method. The pseudo-gradation-processing may be carried out by other various methods such as a dither method, an error diffusion method and the like.

The processing described above is carried out for all the picture elements and a color image signal made up of two-valued color image signal components $Br_{i,j}$, $Bg_{i,j}$ and $Bb_{i,j}$ for all the picture elements is output to the color image output system. The color image output system reproduces an image on the basis of the color image signal.

As can be understood from the description above, in the image processing system of this embodiment, local contrast is enhanced by the local contrast enhancement circuit 3. Accordingly, local contrast of an image can be successfully enhanced without jump in brightness and/or chromaticity differentiation loss even if the image is such as a picture taken against the light where light parts and dark parts are mingled with each other. Further, a transformation curve for compressing the local-contrast-enhanced color image signal within the color reproduction range of the color image output means is generated according to the proportion of picture elements whose colors are inside the color reproduction range of the color image output means to those whose colors are outside the color reproduction range of the color image output means out of the picture elements around each picture element. Accordingly, by transforming the color of each picture element on the basis of the transformation curve generated for the picture element, the color image signal can be compressed without local jump in brightness or chromaticity differentiation loss even if colors inside and outside the color reproduction range are locally concentrated in a small region.

Further, though, in the embodiment described above, local contrast enhancement processing is carried out before color compression processing, color compression processing may be carried out without local contrast enhancement processing.

What is claimed is:

1. An image processing method for carrying out image processing on a color image signal which is made up of a plurality of signal components representing respective picture elements and is obtained by a color image read-out means having a limited color read-out range and outputting a processed color image signal to a color image output means having a limited color reproduction range, the method comprising the steps of counting, for each of the picture elements represented by the color image signal, picture elements whose colors are inside the color reproduction range of the color image output means out of the picture elements included in a predetermined region including the picture element, generating, according to the number of picture elements whose colors are inside the color reproduction range of the color image output means out of the picture elements included in said predetermined region, a transformation curve for compressing the color image signal within the color reproduction range of the color image output means, transforming the color of each picture element on the basis of the transformation curve thus generated, and outputting a color image signal made up of signal components representing the colors of the picture elements thus transformed to said color image output means as said processed image signal, wherein the transformation curve is a first transformation curve on the basis of which a color inside the color reproduction range is not transformed and a color outside the color reproduction range is transformed to a color which is the closest to the color among colors inside the color reproduction range when the number of picture elements whose colors are inside the color reproduction range of the color image output means out of the picture elements included in said predetermined region is equal to the total number of the picture elements included in said predetermined region, a second transformation curve on the basis of which all the colors represented by the color image signal are transformed to colors inside the color reproduction range of the image output means according to the ratio between the color read-out range of the image read-out means and the color reproduction range of the image output means irrespective of whether the color is inside or outside the color reproduction range when the number of picture elements whose colors are inside the color reproduction range of the color image output means out of the picture elements included in said predetermined region is 0, and a third transformation curve which is obtained by interpolation between the first and second transformation curves according to the number of picture elements whose colors are inside the color reproduction range of the color image output means out of the picture elements included in said predetermined region when the number of picture elements whose colors are inside the color reproduction range of the color image output means out of the picture elements included in said predetermined region is larger than 0 and smaller than the total number of the picture elements included in said predetermined region.

2. An image processing method of carrying out image processing on a color image signal which is made up of a plurality of signal components representing respective picture elements and is obtained by a color image read-out means having a limited color read-out range and outputting a processed color image signal to a color image output means having a limited color reproduction range, the method comprising the steps of carrying out local contrast enhancement processing on each of the picture elements represented by the color image signal on the basis of the signal components representing the picture elements included in a first predetermined region including the picture element, thereby obtaining a local-contrast-enhanced color image signal made up of signal components representing the respective picture elements subjected to the local contrast enhancement processing, counting, for each of the picture elements represented by the local-contrast-enhanced color image signal, picture elements whose colors are inside the color reproduction range of the color image output means out of the picture elements included in a second predetermined region including the picture element, generating, according to the number of picture elements whose colors are inside the color reproduction range of the color image output means out of the picture elements included in said second predetermined region, a transformation curve for compressing the local-contrast-enhanced color image signal within the color reproduction range of the color image output means, transforming the color of each picture element on the basis of the transformation curve thus generated, and outputting a color image signal made up of signal components representing the colors of the picture elements thus transformed to said color image output means as said processed image signal;

wherein the transformation curve is a first transformation curve on the basis of which a color inside the color reproduction range is not transformed and a color outside the color reproduction range is transformed to a color which is the closest to the color among colors inside the color reproduction range when the number of picture elements whose colors are inside the color reproduction range of the color image output means out of the picture elements included in said second predetermined region is equal to the total number of the picture elements included in said second predetermined region, a second transformation curve on the basis of which all the colors represented by the color image signal are transformed to colors inside the color reproduction range of the image output means according to the ratio between the color read-out range of the image read-out means and the color reproduction range of the image output means irrespective of whether the color is inside or outside the color reproduction range when the number of picture elements whose colors are inside the color reproduction range of the color image output means out of the picture elements included in said second predetermined region is 0, and a third transformation curve which is obtained by interpolation between the first and second transformation curves according to the number of picture elements whose colors are inside the color reproduction range of the color image output means out of the picture elements included in said second predetermined region when the number of picture elements whose colors are inside the color reproduction range of the color image output means out of the picture elements included in said second predetermined region is larger than 0 and smaller than the total number of the picture elements included in said second predetermined region.

3. An image processing method as defined in claim 2 in which the local contrast enhancement processing is processing in which local contrast around each picture element is enhanced by local histogram equalization method based on lightness components of the signal components representing the picture elements included in the first predetermined region.

4. An image processing system for carrying out image processing on a color image signal which is made up of a plurality of signal components representing respective picture elements and is obtained by a color image read-out means having a limited color read-out range and outputting a processed color image signal to a color image output means having a limited color reproduction range, the system comprising a counter which counts, for each of the picture elements represented by the color image signal, picture elements whose colors are inside the color reproduction range of the color image output means out of the picture elements included in a predetermined region including the picture element, a transformation curve generator which generates, according to the number of picture elements whose colors are inside the color reproduction range of the color image output means out of the picture elements included in said predetermined region, a transformation curve for compressing the color image signal within the color reproduction range of the color image output means, a transformer which transforms the color of each picture element on the basis of the transformation curve generated by the transformation curve generator, and an output means which outputs a color image signal made up of signal components representing the colors of the picture elements thus transformed to said color image output means as said processed image signal, wherein the transformation curve generator generates a first transformation curve on the basis of which a color inside the color reproduction range is not transformed and a color outside the color reproduction range is transformed to a color which is the closest to the color among colors inside the color reproduction range when the number of picture elements whose colors are inside the color reproduction range of the color image output means out of the picture elements included in said predetermined region is equal to the total number of the picture elements included in said predetermined region, a second transformation curve on the basis of which all the colors represented by the color image signal are transformed to colors inside the color reproduction range of the image output means according to the ratio between the color read-out range of the image read-out means and the color reproduction range of the image output means irrespective of whether the color is inside or outside the color reproduction range when the number of picture elements whose colors are inside the color reproduction range of the color image output means out of the picture elements included in said predetermined region is 0, and a third transformation curve which is obtained by interpolation between the first and second transformation curves according to the number of picture elements whose colors are inside the color reproduction range of the color image output means out of the picture elements included in said predetermined region when the number of picture elements whose colors are inside the color reproduction range of the color image output means out of the picture elements included in said predetermined region is larger than 0 and smaller than the total number of the picture elements included in said predetermined region.

5. An image processing system for carrying out image processing on a color image signal which is made up of a plurality of signal components representing respective picture elements and is obtained by a color image read-out means having a limited color read-out range and outputting a processed color image signal to a color image output means having a limited color reproduction range, the system comprising a local contrast enhancement means which carries out local contrast enhancement processing on each of the picture elements represented by the color image signal on the basis of the signal components representing the picture elements included in a first predetermined region including the picture element, thereby obtaining a local-contrast-enhanced color image signal made up of signal components representing the respective picture elements subjected to the local contrast enhancement processing, a counter which counts, for each of the picture elements represented by the local-contrast-enhanced color image signal, picture elements whose colors are inside the color reproduction range of the color image output means out of the picture elements included in a second predetermined region including the picture element, a transformation curve generator which generates, according to the number of picture elements whose colors are inside the color reproduction range of the color image output means out of the picture elements included in said second predetermined region, a transformation curve for compressing the local-contrast-enhanced color image signal within the color reproduction range of the color image output means, a transformer which transforms the color of each picture element on the basis of the transformation curve generated by the transformation curve generator, and an output means which outputs a color image signal made up of signal components representing the colors of the picture elements thus transformed to said color image output means as said processed image signal;

wherein the transformation curve generator generates a first transformation curve on the basis of which a color inside the color reproduction range is not transformed and a color outside the color reproduction range is transformed to a color which is the closest to the color among colors inside the color reproduction range when the number of picture elements whose colors are inside the color reproduction range of the color image output means out of the picture elements included in said second predetermined region is equal to the total number of the picture elements included in said second predetermined region, a second transformation curve on the basis of which all the colors represented by the color image signal are transformed to colors inside the color reproduction range of the image output means according to the ratio between the color read-out range of the image read-out means and the color reproduction range of the image output means irrespective of whether the color is inside or outside the color reproduction range when the number of picture elements whose colors are inside the color reproduction range of the color image output means out of the picture elements included in said second predetermined region is 0, and a third transformation curve which is obtained by interpolation between the first and second transformation curves according to the number of picture elements whose colors are inside the color reproduction range of the color image output means out of the picture elements included in said second predetermined region when the number of picture elements whose colors are inside the color reproduction range of the color image output means out of the picture elements included in said second predetermined region is larger than 0 and smaller than the total number of the picture elements included in said second predetermined region.

6. An image processing system as defined in claim 5 in which the local contrast enhancement means carries out processing in which local contrast around each picture element is enhanced by local histogram equalization method based on lightness components of the signal components representing the picture elements included in the first predetermined region.

* * * * *